United States Patent [19]

Conant

[11] Patent Number: 5,101,097

[45] Date of Patent: Mar. 31, 1992

[54] HAND SWIPE MAGNETIC STRIPE ENCODER

[75] Inventor: Curtis T. Conant, San Pedro, Calif.

[73] Assignee: American Magnetics Corporation, Carson, Calif.

[21] Appl. No.: 534,726

[22] Filed: Jun. 7, 1990

[51] Int. Cl.⁵ .............................. G06K 7/08
[52] U.S. Cl. ........................ 235/449; 360/2
[58] Field of Search .......... 235/449; 360/2, 97, 360/101

[56] References Cited

U.S. PATENT DOCUMENTS 4,309,601  1/1982  Nally et al. .................. 235/449

Primary Examiner—Harold Pitts
Attorney, Agent, or Firm—Herbert M. Shapiro

[57] ABSTRACT

Misaligned magnetic stripe cards are often improperly encoded during a write operation. The problem occurs most frequently in hand swipe encoders where the encoding operation may occur quickly without sufficient care to seat the card properly. A write - disable circuit responsive to the proper positioning of the card prevents such improper encoding, and destruction of valid encoding on adjacent tracks.

6 Claims, 3 Drawing Sheets

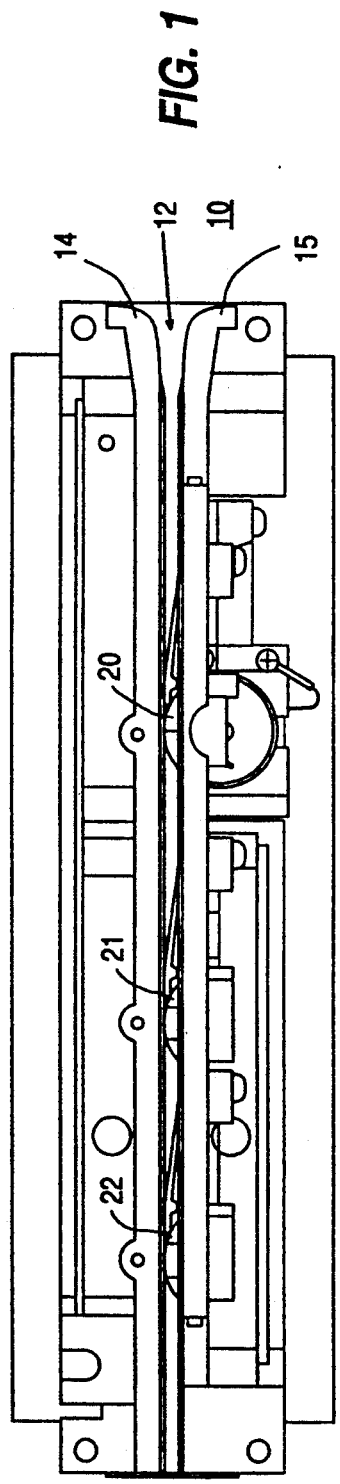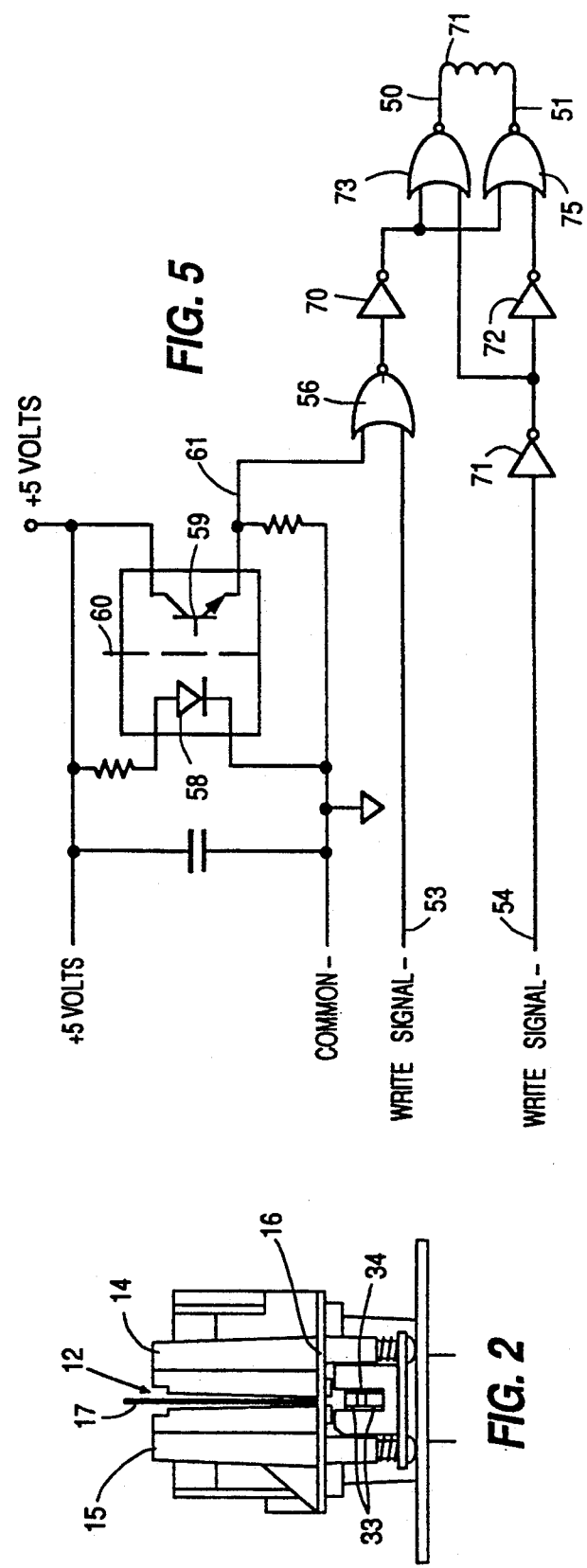

HAND SWIPE MAGNETIC STRIPE ENCODER

FIELD OF THE INVENTION

This invention relates to magnetic stripe encoders and more particularly to hand swipe single and multi-track encoders.

BACKGROUND OF THE INVENTION

Single and multi-track, magnetic stripe encoders are in widespread commercial use. Such encoders are adapted to write on selected tracks on the stripe depending on the design and position of the write head. Writing occurs by the activation and positioning of a single gap write head with respect to the selected track and by the activation of the coil corresponding to the selected gap of a single or multi-gap write head corresponding to the track(s) to be written.

Many encoders are table top motorized apparatus into which a card is inserted for encoding. With apparatus of this type, previously encoded data are on tracks adjacent to the track being encoded not exposed to the risk of being overwritten. This is not the case for hand swipe encoders, where the card is swiped manually through the encoder and card registration is accomplished by hand. In such cases the write head is positioned to encode on a magnetic track when the card is positioned in a vertical plane with its edge moving along a reference surface. Often the card is not seated properly against the reference surface when swiped and track misalignment results. Often, also, previously written data on a track adjacent to the selected track is destroyed.

BRIEF DESCRIPTION OF AN ILLUSTRATIVE EMBODIMENT OF THIS INVENTION

The present invention is directed at the prevention of erroneous encoding of a wrong track because of card misalignment in hand swipe encoders. Misalignment occurs because of improper seating of a magnetic stripe card against a reference surface in the encoder. This results in an edge of the card being at an angle with respect to the reference surface. Thus, the tracks are non-parallel to the reference surface, with which the write head is aligned causing data to be written into a non-selected track. A sensing device, located in line with the write head gap(s), senses when the edge of the card is elevated more than a preset distance from the referenced surface. The sensing device responds to apply a signal to the write circuit to turn the encoding current off.

BRIEF DESCRIPTION OF THE DRAWING

FIG. 1 is a schematic top view of the organization of components in a hand swipe encoder in accordance with the principle of this invention;

FIG. 2 is a schematic card entry view of the encoder of FIG. 1;

FIG. 5 is a schematic diagram of a write circuit for the encoder of FIGS. 1 and 2;

DETAILED DESCRIPTION OF AN ILLUSTRATIVE EMBODIMENT OF THE INVENTION

Figure 3:
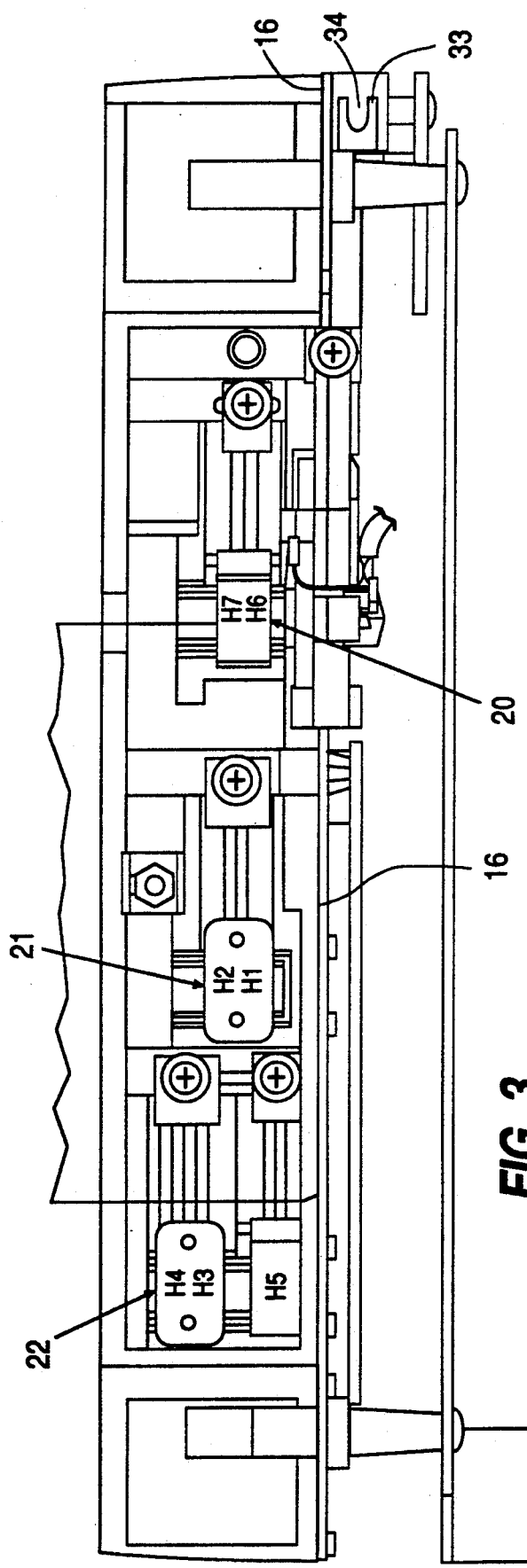
FIG. 3 is a schematic side view of the encoder of FIGS. 1 and 2 including a writeprotect lever arm.

FIG. 1 shows a top view of a credit card encoder 10. The encoder includes a slot 12 defined between side walls 14 and 15. A card to be read and encoded by the unit is inserted into slot 12 and moved between the side walls.

FIG. 2 shows an end view of encoder 10 showing a bearing surface at the bottom of the slot. The bearing surface is defined by the portion of plate 16 exposed between side walls 14 and 15. A credit card 17 properly seated against the bearing surface has its (multi-track) magnetic stripe defined in a vertical plane such that write Head 20 and read heads 21 and 22 contact the magnetic stripe consecutively as the card is moved form right to left as viewed on FIG. 1.

The encoder of FIG. 1 along with its component mechanical organization and electronic circuitry is well understood in the art and is not discussed in detail. The present invention is directed at the problem of encoding, for example, on a multi-track, magnetic stripe card which is not fully seated against the bearing surface. In such a circumstance, the tracks are at an angle to the gaps in the write head and write currents may result in the deleterious encoding of portions of tracks other then the selected track.

FIG. 3 is a schematic side view of the encoder of FIG. 1. The figure shows the write head 20 and read heads 21 and 22. The figure also shows a lever arm 30. Arm 30 has an end 31 extending upward through bearing surface plate 38 as shown in detail in FIG. 4. That portion 31 extends into slot 12 in a manner to contact the bottom of card 17 when the card is properly seated against the bearing surface.

Lever arm 32 has a forked end portion 33 shown also in FIG. 2. Forked end portion 33 defines an opening 34. Arm 30 pivots at 35, indicating a fulcrum for the arm. Arm 32 is biased by spring 37. The spring is operative to bias the arm upward so that portion 31 extends above the bearing surface when no load is applied.

Opening 34 is normally positioned to interrupt the optical path between a light source and a light sensor where the path is clear only when lever arm is forced downward by a properly seated card. A light sensor responds to the presence of light in the path to enable the write circuit. Thus, the write circuit is operative to write onto a selected track of the magnetic stripe only when a card is properly seated against the bearing surface and the tracks are aligned along axes parallel to the bearing surface and perpendicular to the write head gaps. Forked end 33 is spaced apart from the fulcrum a distance four times the distance between fulcrum 36 and portion 31 to provide amplification to the movement of end 33 for occluding the optical path.

FIG. 5 shows a circuit schematic for the write circuit which provides current to the write head. A single track head is indicated. The coil for the gap for a single track is connected between the lines designated 50 and 51. Write enable and write signal levels are maintained at inputs 53 and 54 respectively. A write enable voltage level is maintained at an input to OR circuit 56. A write protect voltage level is maintained on a second input to OR circuit 56 only if a card is properly seated against the bearing surface (i.e., portion 31 of lever arm 30 is flush to surface 38). OR circuit 56 provides an output to disable the write operation if either input is high.

Figure 4:
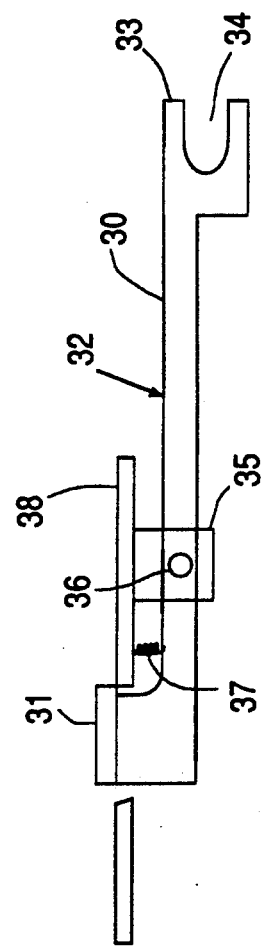
FIG. 4 is a schematic side view of the lever in FIG. 3.

A light-emitting diode (LED) 58 and phototransistor 59 pair are optically coupled via opening 34 of FIG. 4, lever arm 30 moving in a vertical plane indicated by broken line 60 in FIG. 5. The presence of light on transistor 59 results in a high voltage level on line 61. When such a high level occurs along with a write enable level, OR circuit 56 provides an output disabling the write circuit so that no write current is applied to a selected coil about the pole pieces of a gap in the encode head to write onto the corresponding track.

The write circuit for a single track is shown for generating write pulses of first and second polarities as is common. Such circuits include inverters 70, 71 and 72 and OR circuit 73 and 74, to provide pulses of the requisite polarities in coil 77. The circuit is repeated for providing pulses of the requisite polarities for each of the coils associated with the air gaps for each track.

The invention is directed primarily a medium having a plurality of tracks on it's magnetic stripe. Standard ANSI and ISO formats allow a "guard band" of 0.020" between tracks 1 and 2, and 0.030" between tracks 2 and 3. Encoding from either track is allowed on the guardband because the read head(s) are located so that they do not attempt to read in the guard band. Accordingly, hole 38 is sufficiently large to permit writing even if slight elevation of the card from the reference plate occurs. Elevations of 0.01", for example, are permitted. This allows for small imperfections in the reference plate and or magnetic stripe media.

Figure 6:
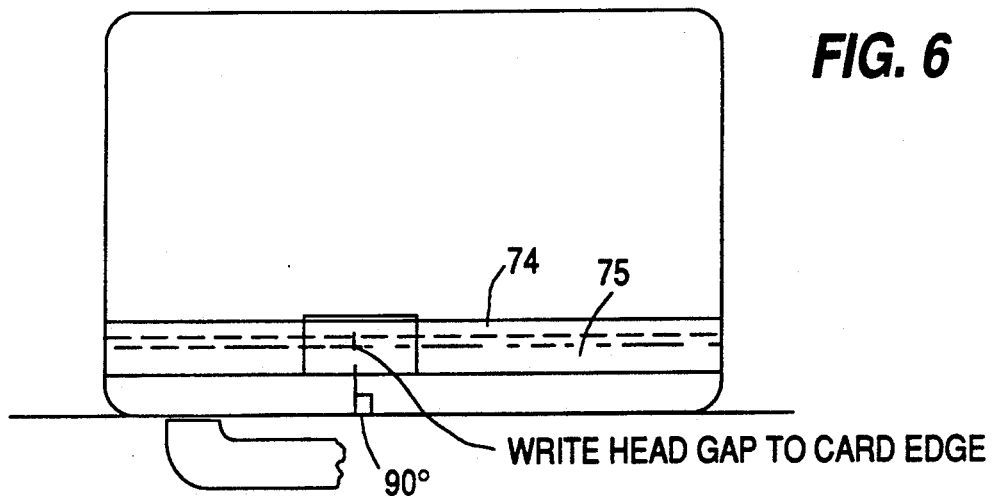
FIGS. 6 and 7 are schematic views of aligned and misaligned card.
Figure 7:
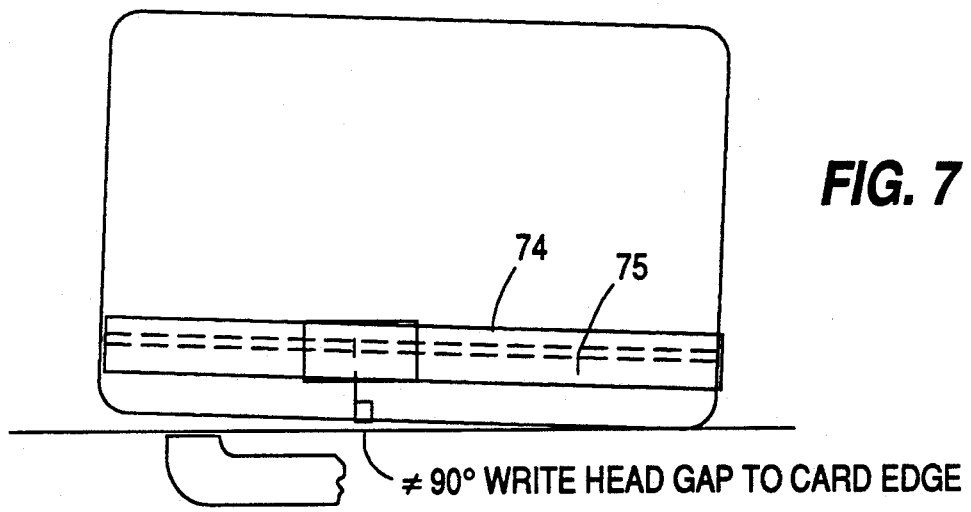
Figure 8:
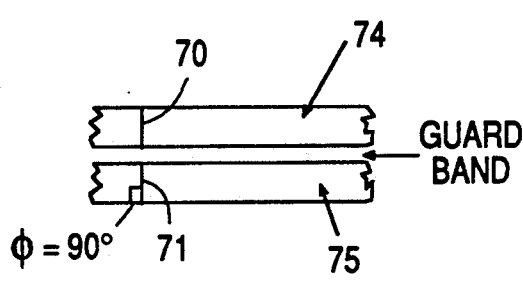
FIGS. 8 and 9 are schematic representations of the detail of FIGS. 8 and 9 respectively.
Figure 9:
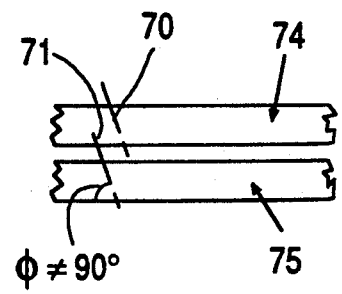

FIGS. 6 and 7 show a representative card with a multi-track, magnetic stripe in properly seated and improperly seated positions respectively. FIGS. 8 and 9 show the detail of adjacent tracks and gap positions. A multi-gap, write head is shown also to demonstrate the positions of the write head gaps with respect to the magnetic stripe in each instance. The gaps are designated by lines 70 and 71 in FIGS. 8 and 9. The tracks are designated 74 and 75. It is clear that erroneous overwriting occurs in the second instance because a write current in the coil associated with track 75 writes on a portion of track 74 as is clear from FIG. 9. But in such circumstances (as shown in FIG. 9) lever arm 30 is not depressed, the optical path through opening 34 of FIG. 4 is occluded and no high level output is present on line 61 of FIG. 5 to enable OR circuit 56. Consequently, the write signal is not applied to the selected coil and no write operation occurs.

What is claimed is:

1. An encoder for magnetic stripe card having an edge and a magnetic stripe positioned parallel to said edge, said encoder including means for encoding said magnetic stripe, said encoder also including a bearing surface for engaging said card at said edge and a normally disabled encoder circuit for writing on said magnetic stripe, said encoder including means responsive to the continuous operation engagement of said bearing surface by said edge for enabling said encoder circuit.

2. An encoder circuit as set forth in claim 1 wherein said means responsive comprises a lever arm, said lever arm normally being in a first position to occlude an optical path, said lever arm being moved to a second position by the engagement of said bearing surface by said edge in which second position said lever arm does not occlude said optical path.

3. An encoder circuit as set forth in claim 2 also including a write circuit including a write head positioned for encoding said magnetic stripe, said circuit including a light source and a light sensor for light from said source along said path, said circuit including enabling means responsive to the presence of light on said sensor only when said arm is in said second position for enabling said write circuit.

4. An encoder as set forth in claim 3 wherein said lever arm includes a first position which protrudes through said bearing surface in the path of said medium in line with said write head, said lever arm rotating about a pivot point between first and second position where said first portion is protruding and not protruding through said bearing surface respectively, said encoder including means for biasing said lever arm into said first position, said lever including a second portion for interrupting the light path between said light source and said light sensor when said lever arm is in said first position.

5. An encoder as set forth in claim 4 wherein said second portion is about four times the distance from said pivot point as is said first position.

6. An encoder as set forth in claim 3 wherein said medium is a magnetic stripe card and said write head includes a plurality of gaps and said gaps are aligned parallel to said bearing surface and spaced apart therefrom a distance to correspond to the position of track on the magnetic stripe of said credit card.

* * * * *